US012114259B2

(12) United States Patent
Chu et al.

(10) Patent No.: US 12,114,259 B2
(45) Date of Patent: Oct. 8, 2024

(54) ACCESS POINT AND STATION MULTI-LINK DEVICE OPERATION

(71) Applicant: NXP USA, Inc., Austin, TX (US)

(72) Inventors: Liwen Chu, San Ramon, CA (US); Hongyuan Zhang, Fremont, CA (US); Young Hoon Kwon, Laguna Niguel, CA (US); Huiling Lou, Sunnyvale, CA (US)

(73) Assignee: NXP USA, Inc., Austin, TX (US)

( * ) Notice: Subject to any disclaimer, the term of this patent is extended or adjusted under 35 U.S.C. 154(b) by 122 days.

(21) Appl. No.: 17/337,043

(22) Filed: Jun. 2, 2021

(65) Prior Publication Data

US 2021/0377856 A1    Dec. 2, 2021

Related U.S. Application Data

(60) Provisional application No. 63/040,523, filed on Jun. 18, 2020, provisional application No. 63/033,782, filed on Jun. 2, 2020, provisional application No. 63/033,785, filed on Jun. 2, 2020.

(51) Int. Cl.
*H04W 52/02* (2009.01)
*H04W 72/0446* (2023.01)
*H04W 84/12* (2009.01)

(52) U.S. Cl.
CPC ... *H04W 52/0216* (2013.01); *H04W 72/0446* (2013.01); *H04W 84/12* (2013.01)

(58) Field of Classification Search
CPC ......... H04W 52/0216; H04W 72/0446; H04W 84/12
See application file for complete search history.

(56) References Cited

U.S. PATENT DOCUMENTS

2019/0045438 A1*  2/2019  Cariou .............. H04W 52/0229
2020/0374802 A1* 11/2020  Chu ................... H04W 52/0216
2021/0084711 A1*  3/2021  Park .................. H04W 72/0453

OTHER PUBLICATIONS

IEEE; "Enhanced multi-link single radio operation"; 802.11be D0.1; Section 35.3.13; 1 page.
IEEE; "Enhanced multi-link multi-radio operation"; 802.11be D0.1; Section 35.3.14; 1 page.
Park, Minyoung et al.; "Enhanced Multi-Link Single Radio Operation" doc.: 802.11-20/0562r1; Apr. 2020; 14 pages.

* cited by examiner

*Primary Examiner* — Mohammad S Anwar

(57) ABSTRACT

Various embodiments relate to a method performed by a multi-link device (MLD) access point to establish a target wake time (TWT) with a MLD station, wherein a plurality of links are established between the MLD access point and the MLD station, including: transmitting, by the MLD access point, a TWT set up frame to the MLD station configured to indicate whether the TWT set up frame is applied to multiple links of the plurality of links; and negotiating, by the MLD access point, a TWT agreement with the MLD station via one of the multiple links with the MLD station, wherein the TWT agreement applies to all of the indicated multiple links.

34 Claims, 2 Drawing Sheets

ACCESS POINT AND STATION MULTI-LINK DEVICE OPERATION

CROSS-REFERENCE TO RELATED APPLICATIONS

This application claims benefit to U.S. Provisional Patent Application Nos. 63/033,782 filed on Jun. 2, 2020, 63/033,785 filed on Jun. 2, 2020, and 63/040,523 filed on Jun. 18, 2020, the contents of each which are hereby incorporated by reference for all purposes as if fully set forth herein.

TECHNICAL FIELD

Various exemplary embodiments disclosed herein relate generally to the operation of multi-link device access point and multi-link device station operation.

SUMMARY

A summary of various exemplary embodiments is presented below. Some simplifications and omissions may be made in the following summary, which is intended to highlight and introduce some aspects of the various exemplary embodiments, but not to limit the scope of the invention. Detailed descriptions of an exemplary embodiment adequate to allow those of ordinary skill in the art to make and use the inventive concepts will follow in later sections.

A method performed by a multi-link device (MLD) access point to establish a target wake time (TWT) with a MLD station, wherein a plurality of links are established between the MLD access point and the MLD station, including: transmitting, by the MLD access point, a TWT set up frame to the MLD station configured to indicate whether the TWT set up frame is applied to multiple links of the plurality of links; and negotiating, by the MLD access point, a TWT agreement with the MLD station via one of the multiple links with the MLD station, wherein the TWT agreement applies to all of the indicated multiple links.

Various embodiments are described, further including tearing down, by the MLD access point, the negotiated TWT agreement.

Various embodiments are described, further including suspending or resuming, by the MLD access point, the negotiated TWT agreement.

Various embodiments are described, further including negotiating, by the MLD access point, a separate TWT agreement with the MLD station for one of the plurality of links that is not one of the multiple links via the one of the plurality of links that is not one of the multiple links with the MLD station.

Various embodiments are described, wherein the TWT set up frame includes a link bitmap that identifies the multiple links of the plurality of links.

Various embodiments are described, wherein the multiple links of the plurality of links are indicated based upon the MLD station type.

Various embodiments are described, wherein MLD station type includes one of enhanced multi-link single radio (eMLSR) station, multi-link single radio (MLSR) station, enhanced multi-link muli radio (eMLMR) station, and multi-link muli radio (MLMR) station.

Various embodiments are described, wherein the multiple links of the plurality of links are associated with eMLSR stations and EMLMR stations.

Various embodiments are described, wherein the TWT service period (SP) for the multiple links start at the same time and end at the same time.

Various embodiments are described, wherein a power save operation transmitted in one of the multiple links is applies to all of the multiple links.

Further various embodiments relate to a method performed by a multi-link device (MLD) station to establish a target wake time (TWT) with a MLD access point, wherein a plurality of links are established between the MLD access point and the MLD station, including: receiving, by the MLD station, a TWT set up frame from the MLD access point configured to indicate whether the TWT set up frame is applied to multiple links of the plurality of links; and negotiating, by the MLD station, a TWT agreement with the MLD access point via one of the multiple links with the MLD access point, wherein the TWT agreement applies to all of the indicated multiple links.

Various embodiments are described, further including tearing down, by the MLD station, the negotiated TWT agreement.

Various embodiments are described, further including suspending or resuming, by the MLD station, the negotiated TWT agreement.

Various embodiments are described, further including negotiating, by the MLD station, a separate TWT agreement with the MLD access point for one of the plurality of links that is not one of the multiple links via the one of the plurality of links that is not one of the multiple links with the MLD access point.

Various embodiments are described, wherein the TWT set up frame includes a link bitmap that identifies the multiple links of the plurality of links.

Various embodiments are described, wherein the multiple links of the plurality of links are indicated based upon the MLD station type.

Various embodiments are described, wherein MLD station type includes one of enhanced multi-link single radio (eMLSR) station, multi-link single radio (MLSR) station, enhanced multi-link muli radio (eMLMR) station, and multi-link muli radio (MLMR) station.

Various embodiments are described, wherein the multiple links of the plurality of links are associated with eMLSR stations and EMLMR stations.

Various embodiments are described, wherein the TWT service period (SP) for the multiple links start at the same time and end at the same time.

Various embodiments are described, wherein a power save operation transmitted in one of the multiple links is applies to all of the multiple links.

Further various embodiments relate to a multi-link device (MLD) access point configured to establish a target wake time (TWT) with a MLD station, wherein a plurality of links are established between the MLD access point and the MLD station, including: a transmitter configured to transmit a TWT set up frame to the MLD station configured to indicate whether the TWT set up frame is applied to multiple links of the plurality of links; and a processor configured to negotiate a TWT agreement with the MLD station via one of the multiple links with the MLD station, wherein the TWT agreement applies to all of the indicated multiple links.

Various embodiments are described, wherein the processor is further configured to tear down the negotiated TWT agreement.

Various embodiments are described, wherein the processor is further configured to suspend or resume the negotiated TWT agreement.

Various embodiments are described, wherein the processor is further configured to negotiate a separate TWT agreement with the MLD station for one of the plurality of links that is not one of the multiple links via the one of the plurality of links that is not one of the multiple links with the MLD station.

Various embodiments are described, wherein the TWT set up frame includes a link bitmap that identifies the multiple links of the plurality of links.

Various embodiments are described, wherein the multiple links of the plurality of links are indicated based upon the MLD station type.

Various embodiments are described, wherein MLD station type includes one of enhanced multi-link single radio (eMLSR) station, multi-link single radio (MLSR) station, enhanced multi-link muli radio (eMLMR) station, and multi-link muli radio (MLMR) station.

Various embodiments are described, wherein the multiple links of the plurality of links are associated with eMLSR stations and EMLMR stations.

Various embodiments are described, wherein the TWT service period (SP) for the multiple links start at the same time and end at the same time.

Various embodiments are described, wherein a power save operation transmitted in one of the multiple links is applies to all of the multiple links.

An multi-link device (MLD) station configured to establish a target wake time (TWT) with a MLD access point, wherein a plurality of links are established between the MLD access point and the MLD station, including: a receiver configured to receive a TWT set up frame to the MLD access point configured to indicate whether the TWT set up frame is applied to multiple links of the plurality of links; and a processor configured to negotiate a TWT agreement with the MLD access point via one of the multiple links with the MLD access point, wherein the TWT agreement applies to all of the indicated multiple links.

Various embodiments are described, wherein the processor is further configured to tear down the negotiated TWT agreement.

Various embodiments are described, wherein the processor is further configured to suspend or resume the negotiated TWT agreement.

Various embodiments are described, wherein the processor is further configured to negotiate a separate TWT agreement with the MLD access point for one of the plurality of links that is not one of the multiple links via the one of the plurality of links that is not one of the multiple links with the MLD station.

Various embodiments are described, wherein the TWT set up frame includes a link bitmap that identifies the multiple links of the plurality of links.

Various embodiments are described, wherein the multiple links of the plurality of links are indicated based upon the MLD station type.

Various embodiments are described, wherein MLD station type includes one of enhanced multi-link single radio (eMLSR) station, multi-link single radio (MLSR) station, enhanced multi-link muli radio (eMLMR) station, and multi-link muli radio (MLMR) station.

Various embodiments are described, wherein the multiple links of the plurality of links are associated with eMLSR stations and EMLMR stations.

Various embodiments are described, wherein the TWT service period (SP) for the multiple links start at the same time and end at the same time.

Various embodiments are described, wherein a power save operation transmitted in one of the multiple links is applies to all of the multiple links.

A method performed by a multi-link device (MLD) access point to carry out a sounding protocol with a MLD station, including: transmitting, by the MLD access point, a first null data packet announcement (NDPA) frame to the station; transmitting, by the MLD access point, a first null data packet (NDP) frame to the station; transmitting, by the MLD access point, a first beamforming repot poll (BFRP) trigger frame to the station; receiving, by the MLD access point, a first sounding report frame from the station; determining, by the MLD access point, when the first sounding report frame is not correctly received; transmitting, by the MLD access point, a second null data packet announcement (NDPA) frame to the station; transmitting, by the MLD access point, a second null data packet (NDP) frame to the station; transmitting, by the MLD access point, a second beamforming repot poll (BFRP) trigger frame to the station; receiving, by the MLD access point, a second sounding report frame from the station; and determining, by the MLD access point, when the second sounding report frame is correctly received.

BRIEF DESCRIPTION OF THE DRAWINGS

In order to better understand various exemplary embodiments, reference is made to the accompanying drawings, wherein.

To facilitate understanding, identical reference numerals have been used to designate elements having substantially the same or similar structure and/or substantially the same or similar function.

DETAILED DESCRIPTION

The description and drawings illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes to aid the reader in understanding the principles of the invention and the concepts contributed by the inventor(s) to furthering the art and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various embodiments described herein are not necessarily mutually exclusive, as some embodiments can be combined with one or more other embodiments to form new embodiments.

Figure 1:
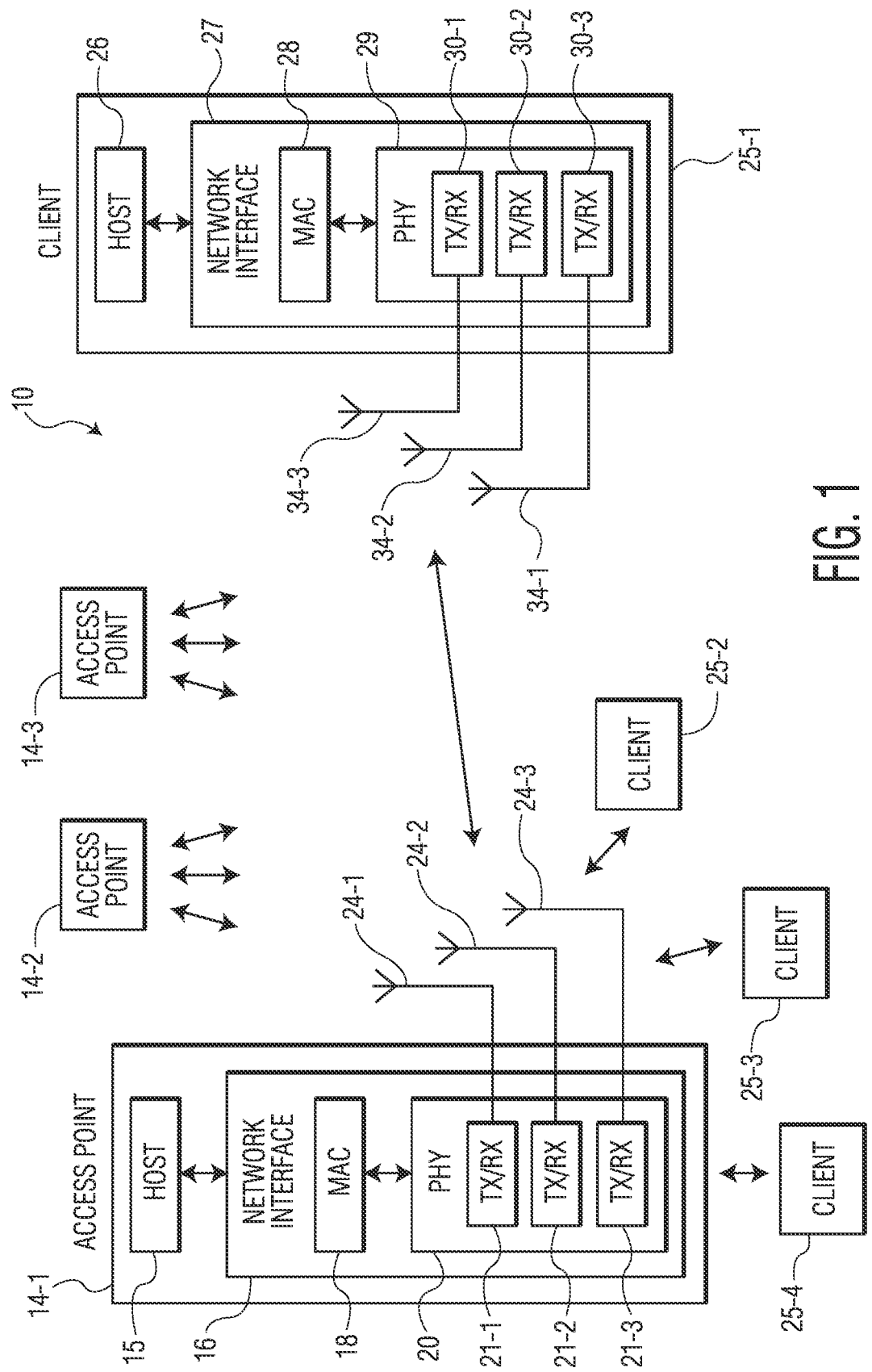
FIG. 1 is a block diagram of an example wireless local area network (WLAN), according to an embodiment.

FIG. 1 is a block diagram of an example wireless local area network (WLAN) 10, according to an embodiment. Such a WLAN 10 may need to be able to update operating parameters across a range of different versions of Wi-Fi or IEEE 802.11. An access point (AP) 14-1 includes a host processor 15 coupled to a network interface 16. The network interface 16 includes a medium access control (MAC) processing unit 18 and a physical layer (PHY) processing unit 20. The PHY processing unit 20 includes a plurality of transceivers 21, and the transceivers 21 are coupled to a plurality of antennas 24. Although three transceivers 21 and three antennas 24 are illustrated in FIG. 1, the AP 14 may include different numbers (e.g., 1, 2, 4, 5, etc.) of transceivers 21 and antennas 24 in other embodiments. The WLAN 10 may include multiple APs 14-1, 14-2, 14-3 as shown, but any number of APs 14 may be included in WLAN 10.

The WLAN 10 includes a plurality of client stations (STA) 25. Although four client stations 25 are illustrated in FIG. 1, the WLAN 10 may include different numbers (e.g., 1, 2, 3, 5, 6, etc.) of client stations 25 in various scenarios and embodiments. The WLAN 10 may also include AP multi-link device (MLD) where one AP MLD includes multiple affiliated APs and client STA multi-link devices (MLD) where one NON-AP MLD includes multiple affiliated STAs. Two or more of the STAs of an NON-AP MLD 25 are configured to receive corresponding data streams that are transmitted simultaneously by the AP 14. Additionally, two or more of the STAs of an NON-AP MLD 25 are configured to transmit corresponding data streams to one AP MLD 14 such that the AP MLD 14 simultaneously receives the data streams. Also, the client station MLD 25 are configured to receive data streams that are transmitted simultaneously by multiple APs of one AP MLD 14. Likewise, the STAs of an NON-AP MLD 25 may transmit data streams simultaneously to the multiple APs of an AP MLD 14.

A client station 25-1 includes a host processor 26 coupled to a network interface 27. The network interface 27 includes a MAC processing unit 28 and a PHY processing unit 29. The PHY processing unit 29 includes a plurality of transceivers 30, and the transceivers 30 are coupled to a plurality of antennas 34. Although three transceivers 30 and three antennas 34 are illustrated in FIG. 1, the client station 25-1 may include different numbers (e.g., 1, 2, 4, 5, etc.) of transceivers 30 and antennas 34 in other embodiments.

In an embodiment, one or more of the client stations 25-2, 25-3, and 25-4 has a structure the same as or similar to the client station 25-1. In these embodiments, the client stations 25 structured like the client station 25-1 have the same or a different number of transceivers and antennas. For example, the client station 25-2 has only two transceivers and two antennas (not shown), according to an embodiment.

In an embodiment, the APs 14 and the client stations 25 contend for communication medium using carrier sense multiple access with collision avoidance (CSMA/CA) protocol or another suitable medium access protocol. Further, in an embodiment, the APs 14 or a client station 25 dynamically selects a bandwidth for a transmission based on channels available for the transmission.

In an embodiment, the APs 14 are configured to simultaneously transmit different orthogonal frequency division multiplexing (OFDM) units to different client stations 25 by forming an OFDM access (OFDMA) data unit that includes the different OFDM data units modulated in respective sub-channel blocks of the OFDMA data unit. In an embodiment, the AP 14 allocates different sub-channels to different client stations and forms the OFDMA data unit that includes OFDM data units directed to by modulating the different client stations in sub-channel blocks corresponding to the sub-channels assigned to the client stations.

In an embodiment, the APs 14 are configured to simultaneously transmit different OFDM units to different client stations 25 by transmitting the different OFDM data units via different space time streams of a MU-MIMO communication channel. In an embodiment, the APs 14 allocates different sub-channels (i.e., space time streams) to different client stations and forms the OFDM data units and modulates the different OFDM data units to the space time streams corresponding to the sub-channels assigned to the client stations.

Various iterations of the 802.11 specification are referred to herein. IEEE 802.11ac is referred to as very high throughput (VHT). IEEE 802.11ax is referred to as high efficiency (HE). IEEE 802.11be is referred to as extreme high throughput (EHT). The terms VHT, HE, and EHT will be used in the descriptions found herein.

As described above a multi-link AP MLD has multiple links where each link has one AP affiliated with the AP MLD. This may be accomplished by having two different radios.

A multi-link NON-AP MLD has one or multiple links where each link has one AP affiliated with the AP MLD. One way to implement the multi-link NON-AP MLD is using two or more radios, where each radio is associated with a specific link. Another way to implement the multi-link NON-AP MLD is using a single radio in multiple different bands. Each band may be associated with a specific link. In this case only one link is available at a time. In yet another implementation, an enhanced multi-link single-radio (EMLSR) NON-AP MLD may be used. The EMLSR NON-AP MLD uses two radios in different bands to implement the STA. For example, on radio may be a lower cost radio with lesser capabilities and the other radio may be a fully functional radio supporting the latest protocols. The EMLSR/EMLMR NON-AP MLD may dynamically switch its working link while it can only transmit or receive through one link at any time. The EMLSR NON-AP MLD may monitor two links simultaneously, for example, detecting medium idle/busy status of each link, or receiving a PPDU on each link. Each radio may have its own backoff time, and when the backoff counter for one of the radios becomes zero that radio and link may be used for transmission. For example, if an AP wants to use the fully functional radio, it may send a control frame that is long enough for the EMLSR NON-AP MLD to switch from the lesser capable radio to the fully functional radio, that may then transmit data to the AP. In one implementation, one non-AP EMLMR MLD has multiple radios in multiple links to monitor the links. When its associated AP MLD transmits initial frame in one link, the EMLMR non-AP MLD switch its radios of the other links to the link so that in the remaining time of the TXOP, more Nss can be used.

The beacon related parameters for the all of the APs of an AP MLD need to be determined for each of the APs. These parameters may include the time synchronization function (TSF), target beacon transmission time (TBTT), beacon interval (BI), and delivery traffic indication map (DTIM) TBBT. In a first option, all the APs of an AP MLD have the same TSF time, TBTT, BI, and DTIM TBTT. In a second option, all of the APs of an AP MLD have the same TSF time, but different BI, TBTT, and DTIM TBTT. In a third option, the APs of an AP MLD have different TSF times, but their BIs are same. In a further option, the APs of an AP MLD have different TSF time, BIs, TBTT, and DTIM TBTT. When the TBTTs of the different links do not occur at the same time, a non-simultaneous transmit and receive (NSTR) NON-AP MLD that decodes the Beacons in a first link should not transmit PPDUs at the TBTTs of the first link.

A first option for transmit wake time (TWT) establishment, tear down, and suspension/resumption will now be described. A NON-AP MLD and AP MLD negotiate the TWT agreements of a TWT Flow Identifier for multiple links through TWT Setup frame for one link where the TWT parameters are based on the TWT start time (TST) time of the link. The TWT Setup frame may be changed to indicate whether the TWT element is applied to multiple links. This may be accomplished by a link bitmap, where each bit corresponds to a specific link and indicates that the TWT element specified is applied to each of the indicated links. For example, there are three links between the NON-AP MLD and AP MLD. A bitmap of 110 may indicate that the TWT element specified is applied to the first and second link. The TWT paraments for the third link will be negotiated separately.

As one TWT element defines the TWT agreement for the multiple links, the TWT service period (SP) in multiple links start at the same time and end at the same time. The related TWT agreements have the same other parameters (e.g., Trigger enabled/non-Trigger enable, announced/unannounced).

This option applies to TWT Information and TWT Teardown as well. A NON-AP MLD and AP MLD suspend/resume the TWT SPs of a TWT Flow Identifier of all indicated links through a TWT Information frame in one link where the TWT parameters are based on the TST. A NON-AP MLD and AP MLD teardown the TWT SPs of a TWT Flow Identifier of all links through TWT Teardown frame in one link.

In another embodiment, the application of the TWT element to a specific link depends on the NON-AP MLD's type (i.e., eMLSR non-AP MLD, MLSR non-AP MLD, eMLMR non-AP MLD, MLMR non-AP MLD) to decide whether the TWT element can be applied to all links that work in eMLSR non-AP MLD or eMLMR non-AP MLD.

A second option for transmit wake time (TWT) establishment, tear down, and suspension/resumption will now be described. A NON-AP MLD and AP MLD negotiate the TWT agreements through TWT Setup in a link for that link only. The TWT SPs of the different links with the same TWT Flow Identifier start at the same time (i.e., the TWT Target Times of different links (may with or without different value per the TSF times of different links) identify the same start time), have the same duration, interval, and the same other parameters (i.e., Trigger enabled/non-Trigger enable, announced/unannounced). A NON-AP MLD and AP MLD suspend/resume the TWT SP of a TWT Flow Identifier of a link through TWT Information frame in the link. The resumption of different links for the same TWT Flow Identifier have same restart time. A NON-AP MLD and AP MLD teardown the TWT SP of a TWT Flow Identifier of a link is carried out though the TWT Teardown frame in the link.

A third option for transmit wake time (TWT) establishment, tear down, and suspension/resumption will now be described. A NON-AP MLD and AP MLD negotiate the TWT agreements for all links through the enhanced TWT Setup frame in one link. An modified TWT Setup frame carries one TWT element for each link. Further, the TWT SPs of the different links start at the same time, have the same duration, interval, and the same other parameters (e.g., Trigger enabled/non-Trigger enable, announced/unannounced). The TWT Information frame and TWT Teardown frame may be the same as described above for either the first or the second option.

TWT may be announced for the multiple links in different ways as described below. In a first option, the CTS within a multi-user request to send (MU-RTS)/clear to send (CTS) (or other control frames, e.g., Basic Trigger/quality of service (QoS) Null, etc.) can be used as the readiness announcement of NON-AP MLD within announced TWT. Further, when the AP MLD transmits an MU-RTS to a single NON-AP MLD, the CTS can be used as the readiness announcement of NON-AP MLD within announced TWT for all of the links covered by the TWT announcement.

In a second option, after the transmission of an MU-RTS/CTS, an additional control frame that may include one of Basic/buffer status report poll (BSRP)/bandwidth query report poll (BQRP)/null data packet (NDP) feedback report poll (NRFP)/multi-user block ACK report (MU-BAR) Trigger is used to poll readiness of the NON-AP MLD's.

Various options for power save operation across the various links will now be described. In a first option, when a power save frame is transmitted (e.g., to switch between power save mode and active mode or switch between awake state and doze state) in any one link, the transmitted power save parameters should be applied to all the links for an enhanced single-radio NON-AP MLD. This may include an eMLSR or EMLMR NON-AP MLD. The baseline frame exchange plus a NON-AP MLD capability check is used for such a power save operation indication. The approach uses an implicit approach where the power save frame is applied to all the links.

In second option, the baseline frame exchange plus a link indication (e.g., all multiple the links) is used for such indication. The checking of the NON-AP MLD's capabilities is not needed. However the AP MLD needs to find the NON-AP MLD's address of another link. This assumes that each link in an EMLSR/EMLMR NON-AP MLD has a different link address. Otherwise this is not needed. This second option may be applied to all different types of NON-AP MLDs and requires an explicit indication of which links that a power save frame applies to.

Figure 2:
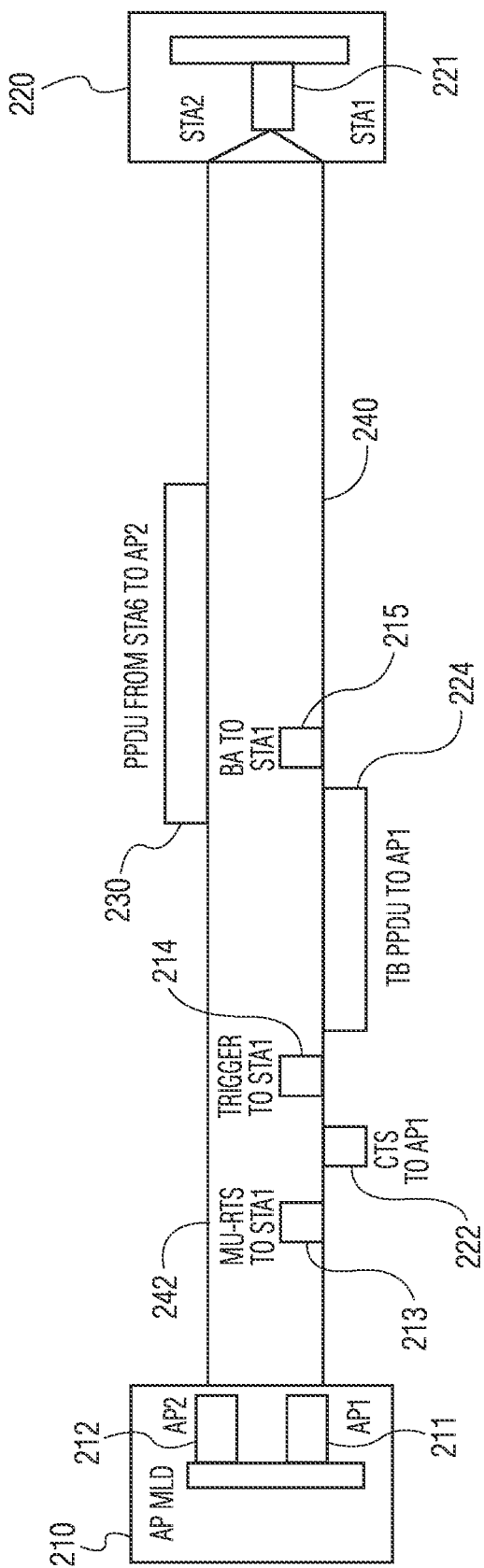
FIG. 2 illustrates a frame exchange between a first AP1 and a first STA1 on a first link.

How an EMLSR/EMLMR NON-AP MLD responds on one link to a transmission by the AP on another link will now be described. One observation is that an EMLSR/EMLMR NON-AP MLD may not be able to record duration information in all its radios/links. As a result, the EMLSR/EMLMR NON-AP MLD will need to physically detect a signal on the medium before transmitting. How the EMLSR/EMLMR NON-AP MLD responses on a fully functional link 2 after frame exchanges in link 1 will now be described. FIG. 2 illustrates a frame exchange between a first AP1 and a first STA1 on a first link. An AP MLD 210 includes two APs AP1 211 and AP2 212. An EMLSR/EMLMR NON-AP MLD 220 include single device that implements two stations STA1 and STA2. AP1 communicates with STA1 on a link 1 240. AP2 communicates with STA2 on link 2 242. AP1 211 initiates a frame exchange with STA1 on link 1 240 by transmitting an MU-RTS 213. STA1 responds by transmitting a CTS 222 to AP1 211. AP1 211 then transmits a trigger frame 214 to STA1. STA1 responds with a trigger based PHY protocol data unit (TB PPDU) 224. AP1 211 then transmits a block acknowledge (BA) 215 to STA1. A problem can arise when another station STA6 (not shown) transmits a PPDU to AP2 212. When STA2 is ready to transmit it needs to sample the physical channel to determine if it is available before transmitting to AP2 212 on link 2 242.

Within NAVSyncTime after a TXOP of a partial functional link 1 242 with the associated AP MLD 210, the NON-AP MLD 220 detects the medium busy/idle in a primary 20 MHz channel (or any 20 MHz channel if required) of the link 2 242 using the energy detection level smaller than −62 dbm (e.g., −82 dbm or other value) and PPDU detection level of −82 dbm. After detecting a valid PPDU or the expiration of NAVSyncTime, the NON-AP MLD 220 detects medium busy/idle in primary 20 MHz channel of the full functional link per a CCA level of −82 dbm and an energy detection level of −62 dbm.

The following normal responding rules apply, except for when within the NAVSyncTime after a TXOP. The following RTS/CTS, MU-RTS/CTS (all or part of them) may be used to initiate a TXOP:

- static BW negotiation with static channel puncture (within the negotiated BW, the 20 MHz channels not being punctured by the BSS operating parameters cannot be punctured);
- dynamic BW negotiation with static channel puncture (within the negotiated BW, the 20 MHz channels not being punctured by the BSS operating parameters cannot be punctured);
- static BW negotiation with dynamic channel puncture (within the negotiated BW, the 20 MHz channels not being punctured by the BSS operating parameters can be further punctured); and
- dynamic BW negotiation with dynamic channel puncture (within the negotiated BW, the 20 MHz channels not being punctured by the BSS operating parameters can be further punctured).

During a sounding protocol an AP receives sounding information from a STA in order to implement beamforming for a transmission. Trigger based (TB) sounding and non-TB sounding are proposed in 11ax. It is assumed that in EHT, TB and non-TB sounding are still used. Sounding may be performed by the AP sending out an null data packet announcement (NDPA) followed by a null data packet (NDP) and then followed by a beamforming repot poll (BFRP) to the STA. In response, the STA sends back a sounding feedback frame. Currently when the sound feedback frame is not properly received, the AP will send out a BFRP Trigger to request the missing sounding feedback data.

A new sounding protocol embodiment is proposed. In this sounding protocol the polling of unsuccessful sounding feedback to receive a partial sound feedback is not allowed. Instead, when the sounding feedback is not complete, the AP resends the NDP Announcement, NDP, and BRFP trigger to the STA in order to receive a complete sounding feedback report back from the STA.

In one prior art implementation of eMLSR non-AP MLD, an EMLSR NON-AP MLD announces its capability about when it is ready to receive PPDU with full capability after receiving the initial non-HT duplicate PPDU with restricted control frames (e.g., RTS/MU-RTS) and restricted data rate (e.g., 24 Mbps). In each TXOP, the AP MLD transmits a RTS/MU-RTS in non-HT duplicate PPDU to an EMLSR NON-AP MLD. After receiving responding CTS, the AP MLD transmits an EHT PPDU to the EMLSR/EMLMR NON-AP MLD.

In another prior implementation of an eMLSR non-AP MLD, the following features are further defined. In one link of an EST NON-AP MLD, any PPDU format can be transmitted without initial non-HT duplicate PPDU handshake. However the number of spatial streams (Nss) being used (or other Rx capability) could be less than the capacity announced by the EMLSR/EMLMR NON-AP MLD. In other links of EMLSR/EMLMR NON-AP MLD, the initial non-HT duplicate PPDU handshake is required in each TXOP before EHT PPDU transmission or PPDU exchanges with Rx full capability.

These two prior art solutions lead to the following issues. When two EMLSR/EMLMR NON-AP MLDs communicate with each other, it is not clear how to enhance the performance. Also, when a (mobile) EMLSR/EMLMR AP MLD and a mobile EMLSR/EMLMR NON-AP MLD communicate with each other, it is not clear how to enhance the performance.

The capability announcement may be carried out as follows to overcome the issues identified above. Each EMLSR/EMLMR NON-AP MLD announces its EMLSR/EMLMR MLD capability and the delay time between the reception of the first soliciting PPDU with reduced reception capacity until the reception of the PPDU with full capacity (Nss, EHT PPDU). When the first EMLSR/EMLMR NON-AP MLD detects the PPDU from the second EMLSR/EMLMR NON-AP MLD in link 1 in a TXOP, the first NON-AP MLD does not transmit frames to the second EST NON-AP MLD in a link other than link 1 within the remaining time of the TXOP of link 1.

In each link when the first EMLSR/EMLMR NON-AP MLD tries to transmit an EHT PPDU or other PPDU to the second EMLSR/EMLMR NON-AP MLD with full capacity (Nss, modulation and coding scheme (MCS), BW) of the second EMLSR/EMLMR NON-AP MLD, the first NON-AP MLD transmits a RTS/MU-RTS in non-HT duplicate PPDU to the second EMLSR/EMLMR NON-AP MLD as the first PPDU of a TXOP. This is done because it is not clear which of the links corresponds to which radio (i.e., fully functional radio or low cost radio). The MU-RTS may be padded when the time between the end of PPDU carrying MU-RTS/RTS and the following PPDU transmitted by the first EMLSR/EMLMR STA is not long enough. After receiving the responding PPDU from the second EMLSR/EMLMR NON-AP MLD, the first EMLSR/EMLMR NON-AP MLD transmits EHT PPDU or other PPDU to the second EMLSR/EMLMR NON-AP MLD with full capacity of the second EMLSR/EMLMR NON-AP MLD within the remaining time of the TXOP.

The specific operation of the enhanced EMLSR/EMLMR operation will now be described. When the first EMLSR/EMLMR NON-AP MLD tries to transmit an EHT PPDU or other PPDU to the second EMLSR/EMLMR NON-AP MLD with full capacity/capability (Nss, MCS, BW) of the second EMLSR/EMLMR NON-AP MLD on a link where the second EMLSR/EMLMR STA can only receive a non-HT duplicate PPDU, the first NON-AP MLD transmits a RTS/MU-RTS in non-HT duplicate PPDU (as the first PPDU in a TXOP) to the second EMLSR/EMLMR NON-AP MLD, i.e., less capability usage is applied to the first frame exchange. The MU-RTS may be padded when the time between the end of PPDU carrying MU-RTS/RTS and the following PPDU transmitted by the first EMLSR/EMLMR STA is not long enough. After receiving the responding PPDU from the second EMLSR/EMLMR NON-AP MLD, the first EMLSR/EMLMR NON-AP MLD transmits EHT PPDU or other PPDU to the second EMLSR/EMLMR NON-AP MLD with full capacity (Nss, MCS, BW) of the second EMLSR/EMLMR NON-AP MLD within the remaining time of the TXOP.

When the first EMLSR/EMLMR NON-AP MLD tries to transmit EHT PPDU or other PPDU to the second EMLSR/EMLMR NON-AP MLD with full capacity (Nss, MCS, BW) of the second EMLSR/EMLMR NON-AP MLD on a link where the second EMLSR/EMLMR STA can receive non-HT duplicate PPDU or other PPDU with reduced Nss, the first NON-AP MLD transmits a RTS/MU-RTS in non-HT duplicate PPDU or other PPDU (as the first PPDU in a TXOP) whose Rx Nss is less than the Rx Nss of second EMLSR/EMLMR NON-AP MLD to the second EMLSR/EMLMR NON-AP MLD, i.e., less capability usage is applied to the first frame exchange. After receiving the responding PPDU from the second EMLSR/EMLMR NON-AP MLD, the first EMLSR/EMLMR NON-AP MLD transmits EHT PPDU or other PPDU to the second EMLSR/EMLMR NON-AP MLD with full capacity (Nss, MCS, BW) of the second EMLSR/EMLMR NON-AP MLD within the remaining time of the TXOP.

The two EMLSR/EMLMR NON-AP MLDs have same less capacity usage in the same link, e.g., non-HT duplicate control frame in 2.4 GHz link, one less than max Rx Nss in 5 GHz link.

The beacon operation of the EMLSR/EMLMR AP MLD and EMLSR/EMLMR NON-AP MLD will now be described.

In one option, the EMLSR/EMLMR AP MLD transmits its beacon in one of its links only. Alternatively, the EMLSR/EMLMR AP MLD may transmit its Beacon in each ink.

For the reception of the beacon, an EMLSR/EMLMR NON-AP MLD that associates with an EMLSR/EMLMR AP MLD and gets its link ready to receive the beacon frame at the TBTT in a link where the associated EMLSR/EMLMR AP MLD transmits its beacons.

For enhanced EMLSR/EMLMR operation, on a link where the EMLSR/EMLMR NON-AP MLD can only receive RTS/MU-RTS in non-HT PPDU, the EMLSR/EMLMR NON-AP MLD that associates with an EMLSR/EMLMR AP MLD gets its link ready to receive beacon frame at the TBTT in a link where the associated EMLSR/EMLMR AP MLD transmits its beacons.

The system and method described herein may be carried out using specific hardware to perform the actions or software running on a processor may implement the embodiments. The processor may be connected to memory and storage, where the software instructions are stored in the storage. The processor may be any general purpose processor, a graphics processor, a signal processor, or any other type of specialized processor.

Any combination of specific software running on a processor to implement the embodiments of the invention, constitute a specific dedicated machine.

As used herein, the term "non-transitory machine-readable storage medium" will be understood to exclude a transitory propagation signal but to include all forms of volatile and non-volatile memory.

It should be appreciated by those skilled in the art that any block diagrams herein represent conceptual views of illustrative circuitry embodying the principles of the invention.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the invention, which is defined only by the claims.

What is claimed is:

1. A method performed by a multi-link device (MLD) access point to establish a target wake time (TWT) with a MLD station, wherein a plurality of links are established between the MLD access point and the MLD station, comprising:
   transmitting, by the MLD access point, a TWT set up frame to the MLD station configured to indicate whether the TWT set up frame is applied to multiple links within the plurality of links; and
   negotiating, by the MLD access point, a single TWT agreement with the MLD station via one of the multiple links with the MLD station, wherein the single TWT agreement applies to all of the indicated multiple links, and wherein TWT service periods in the indicated multiple links start at same time and end at same time, and have same trigger enabled/non-trigger enable and announced/unannounced parameters;
   wherein the TWT set up frame includes a link bitmap having a set of bits;
   wherein each of the bits corresponds to one specific link in the plurality of links and indicates whether the negotiated single TWT agreement is applied to the specific link; and
   tearing down, by the MLD access point, the negotiated TWT agreement, wherein tearing down, by the MLD access point, the negotiated TWT agreement comprises tearing down the TWT service periods of a TWT flow identifier of all of the indicated multiple links through a TWT teardown frame in one link.

2. The method of claim 1, further comprising suspending or resuming, by the MLD access point, the negotiated TWT agreement.

3. The method of claim 1, further comprising negotiating, by the MLD access point, a separate TWT agreement with the MLD station for one of the plurality of links that is not one of the multiple links via the one of the plurality of links that is not one of the multiple links with the MLD station.

4. The method of claim 1, wherein the multiple links of the plurality of links are indicated based upon the MLD station type.

5. The method of claim 4, wherein MLD station type includes one of enhanced multi-link single radio (eMLSR) station, multi-link single radio (MLSR) station, enhanced multi-link multi-radio (eMLMR) station, and multi-link multi-radio (MLMR) station.

6. The method of claim 5, wherein the multiple links of the plurality of links are associated with eMLSR stations and EMLMR stations.

7. The method of claim 1, wherein the TWT service period (SP) for the multiple links start at the same time and end at the same time.

8. The method of claim 1, wherein a power save operation transmitted in one of the multiple links is applies to all of the multiple links.

9. A method performed by a multi-link device (MLD) station to establish a target wake time (TWT) with a MLD access point, wherein a plurality of links are established between the MLD access point and the MLD station, comprising:
   receiving, by the MLD station, a TWT set up frame from the MLD access point configured to indicate whether the TWT set up frame is applied to multiple links of the plurality of links; and
   negotiating, by the MLD station, a TWT agreement with the MLD access point via one of the multiple links with the MLD access point, wherein the TWT agreement applies to all of the indicated multiple links, and wherein TWT service periods in the indicated multiple links start at same time and end at same time, and have same trigger enabled/non-trigger enable and announced/unannounced parameters;
   wherein the TWT set up frame includes a link bitmap having a set of bits;

wherein each of the bits corresponds to one specific link in the plurality of links and indicates whether the negotiated single TWT agreement is applied to the specific link; and tearing down, by the MLD station, the negotiated TWT agreement, wherein tearing down, by the MLD station, the negotiated TWT agreement comprises tearing down the TWT service periods of a TWT flow identifier of all of the indicated multiple links through a TWT teardown frame in one link.

10. The method of claim 9, further comprising suspending or resuming, by the MLD station, the negotiated TWT agreement.

11. The method of claim 9, further comprising negotiating, by the MLD station, a separate TWT agreement with the MLD access point for one of the plurality of links that is not one of the multiple links via the one of the plurality of links that is not one of the multiple links with the MLD access point.

12. The method of claim 9, wherein the multiple links of the plurality of links are indicated based upon the MLD station type.

13. The method of claim 12, wherein MLD station type includes one of enhanced multi-link single radio (eMLSR) station, multi-link single radio (MLSR) station, enhanced multi-link multi-radio (eMLMR) station, and multi-link multi-radio (MLMR) station.

14. The method of claim 13, wherein the multiple links of the plurality of links are associated with eMLSR stations and EMLMR stations.

15. The method of claim 9, wherein the TWT service period (SP) for the multiple links start at the same time and end at the same time.

16. The method of claim 9, wherein a power save operation transmitted in one of the multiple links is applies to all of the multiple links.

17. A multi-link device (MLD) access point configured to establish a target wake time (TWT) with a MLD station, wherein a plurality of links are established between the MLD access point and the MLD station, comprising:
a transmitter configured to
transmit a TWT set up frame to the MLD station configured to indicate whether the TWT set up frame is applied to multiple links of the plurality of links; and
a processor configured to
negotiate a TWT agreement with the MLD station via one of the multiple links with the MLD station, wherein the TWT agreement applies to all of the indicated multiple links, and wherein TWT service periods in the indicated multiple links start at same time and end at same time, and have same trigger enabled/non-trigger enable and announced/unannounced parameters;
wherein the TWT set up frame includes a link bitmap having a set of bits;
wherein each of the bits corresponds to one specific link in the plurality of links and indicates whether the negotiated single TWT agreement is applied to the specific link, and
wherein the processor is further configured to tear down the negotiated TWT agreement by tearing down the TWT service periods of a TWT flow identifier of all of the indicated multiple links through a TWT teardown frame in one link.

18. The MLD access point of claim 17, wherein the processor is further configured to suspend or resume the negotiated TWT agreement.

19. The MLD access point of claim 17, wherein the processor is further configured to negotiate a separate TWT agreement with the MLD station for one of the plurality of links that is not one of the multiple links via the one of the plurality of links that is not one of the multiple links with the MLD station.

20. The MLD access point of claim 17, wherein the multiple links of the plurality of links are indicated based upon the MLD station type.

21. The MLD access point of claim 20, wherein MLD station type includes one of enhanced multi-link single radio (eMLSR) station, multi-link single radio (MLSR) station, enhanced multi-link multi-radio (eMLMR) station, and multi-link multi-radio (MLMR) station.

22. The MLD access point of claim 21, wherein the multiple links of the plurality of links are associated with eMLSR stations and EMLMR stations.

23. The MLD access point of claim 17, wherein the TWT service period (SP) for the multiple links start at the same time and end at the same time.

24. The MLD access point of claim 17, wherein a power save operation transmitted in one of the multiple links is applies to all of the multiple links.

25. The MLD access point of claim 17:
wherein if the link bitmap does not indicate that the negotiated single TWT agreement is applied to a particular link, then a separate TWT agreement will be negotiated separately for the particular link.

26. A multi-link device (MLD) station configured to establish a target wake time (TWT) with a MLD access point, wherein a plurality of links are established between the MLD access point and the MLD station, comprising:
a receiver configured to
receive a TWT set up frame to the MLD access point configured to indicate whether the TWT set up frame is applied to multiple links of the plurality of links; and
a processor configured to
negotiate a TWT agreement with the MLD access point via one of the multiple links with the MLD access point, wherein the TWT agreement applies to all of the indicated multiple links, and wherein TWT service periods in the indicated multiple links start at same time and end at same time, and have same trigger enabled/non-trigger enable and announced/unannounced parameters;
wherein the TWT set up frame includes a link bitmap having a set of bits;
wherein each of the bits corresponds to one specific link in the plurality of links and indicates whether the negotiated single TWT agreement is applied to the specific link, and
wherein the processor is further configured to tear down the negotiated TWT agreement by tearing down the TWT service periods of a TWT flow identifier of all of the indicated multiple links through a TWT teardown frame in one link.

27. The MLD station of claim 26, wherein the processor is further configured to suspend or resume the negotiated TWT agreement.

28. The MLD station of claim 26, wherein the processor is further configured to negotiate a separate TWT agreement with the MLD access point for one of the plurality of links that is not one of the multiple links via the one of the plurality of links that is not one of the multiple links with the MLD station.

29. The MLD station of claim 26, wherein the multiple links of the plurality of links are indicated based upon the MLD station type.

30. The MLD station of claim 29, wherein MLD station type includes one of enhanced multi-link single radio (eMLSR) station, multi-link single radio (MLSR) station, enhanced multi-link multi-radio (eMLMR) station, and multi-link multi-radio (MLMR) station.

31. The MLD station of claim 30, wherein the multiple links of the plurality of links are associated with eMLSR stations and EMLMR stations.

32. The MLD station of claim 26, wherein the TWT service period (SP) for the multiple links start at the same time and end at the same time.

33. The MLD station of claim 26, wherein a power save operation transmitted in one of the multiple links is applies to all of the multiple links.

34. The MLD station of claim 26:
wherein if the link bitmap does not indicate that the negotiated single TWT agreement is applied to a particular link, then a separate TWT agreement will be negotiated separately for the particular link.

* * * * *